United States Patent

Qureshi et al.

[11] Patent Number: 5,974,480
[45] Date of Patent: Oct. 26, 1999

[54] DMA CONTROLLER WHICH RECEIVES SIZE DATA FOR EACH DMA CHANNEL

[75] Inventors: Amjad Z. Qureshi, San Jose; Kab Ju Moon, Cupertino; Le Trong Nguyen, Monte Sereno; Hoyoung Kim, San Jose, all of Calif.

[73] Assignee: Samsung Electronics Co., Ltd., Rep. of Korea

[21] Appl. No.: 08/733,411

[22] Filed: Oct. 18, 1996

[51] Int. Cl.$^6$ ..................................................... G06F 9/00
[52] U.S. Cl. ............................................. 710/27; 710/126
[58] Field of Search ................................... 395/842, 847; 710/22, 27, 126, 128

[56] References Cited

U.S. PATENT DOCUMENTS

| | | | |
|---|---|---|---|
| 5,404,481 | 4/1995 | Miyamori | 395/842 |
| 5,434,983 | 7/1995 | Yaso et al. | 395/290 |
| 5,548,786 | 8/1996 | Amini et al. | 395/842 |
| 5,604,865 | 2/1997 | Lentz et al. | 395/311 |
| 5,619,727 | 4/1997 | Chen et al. | 710/27 |
| 5,651,138 | 7/1997 | Le et al. | 711/154 |
| 5,809,333 | 9/1998 | Story et al. | 710/27 |
| 5,812,800 | 9/1998 | Gulick et al. | 710/128 |

FOREIGN PATENT DOCUMENTS 408241271A   9/1996   Japan .

OTHER PUBLICATIONS

PD8257 Programmable DMA Controller, NEC 1987 Microcomputer Products Data Book, vol. 2 of 2, pp. 8–79 through 8–89, (1987).

PD71071 DMA Controller, NEC 1987 Microcomputer Products Data Book, vol. 2 of 2, pp. 7–91 through 7–125, (1987).

"Am29200 Microprocessor Block Diagram", 2 pages, (date unknown).

"82C37A–5 CHMOS High Performance Programmable DMA Controller", Intel, Sep. (1988), pp. 3–33 –3–50.

"KS0122 Product Brief", Samsung Electronics, Advance Information, pp. 1–8 (date unknown).

"KS0119 Data Sheet" Samsung Semiconductor, pp. 1–50 (Jul., 1995).

"Digital Video Interface Application Notes", pp. 1–19 and 51–54, Samsung Data Sheet (date unknown).

1996 Samsung Databook, "Multi Media IC", Samsung Electronics pp. 47–93 and 134–161, (Nov. 1995).

"Am29200 and Am29205 RISC Microcontrollers User's Manual", Advanced Micro Devices, pp. 11–1 through 11–15, (1994).

"Serial Port 16–Bit SoundComm Codec", Analog Devices AD1843, pp. 20–25, (1996).

"Am29200 and Am29205 RISC Microcontrollers", Advanced Micro Devices, pp. 1–31, (1994).

Primary Examiner—Dung C. Dinh
Attorney, Agent, or Firm—Skjerven, Morrill, MacPherson, Franklin & Friel LLP

[57] ABSTRACT

A DMA controller receives size data in association with a DMA request. If first size data is received, a first amount of data (for example, one word) is transferred through the DMA controller for the DMA request. If, on the other hand, second size data is received, then a second amount of data (for example, two words) is transferred through the DMA controller for the DMA request. In the event that a DMA request cannot be serviced when received, the DMA request is stored in the DMA controller for later servicing. Size data for a DMA request is stored so that the size of the data transfer will be known when the stored DMA request is serviced. Using this size data, a single DMA channel can support data transfers of different sizes. In some embodiments, size data is used to increment a DMA current address register by the correct amount after the data associated with the size data is transferred through the DMA controller.

16 Claims, 12 Drawing Sheets

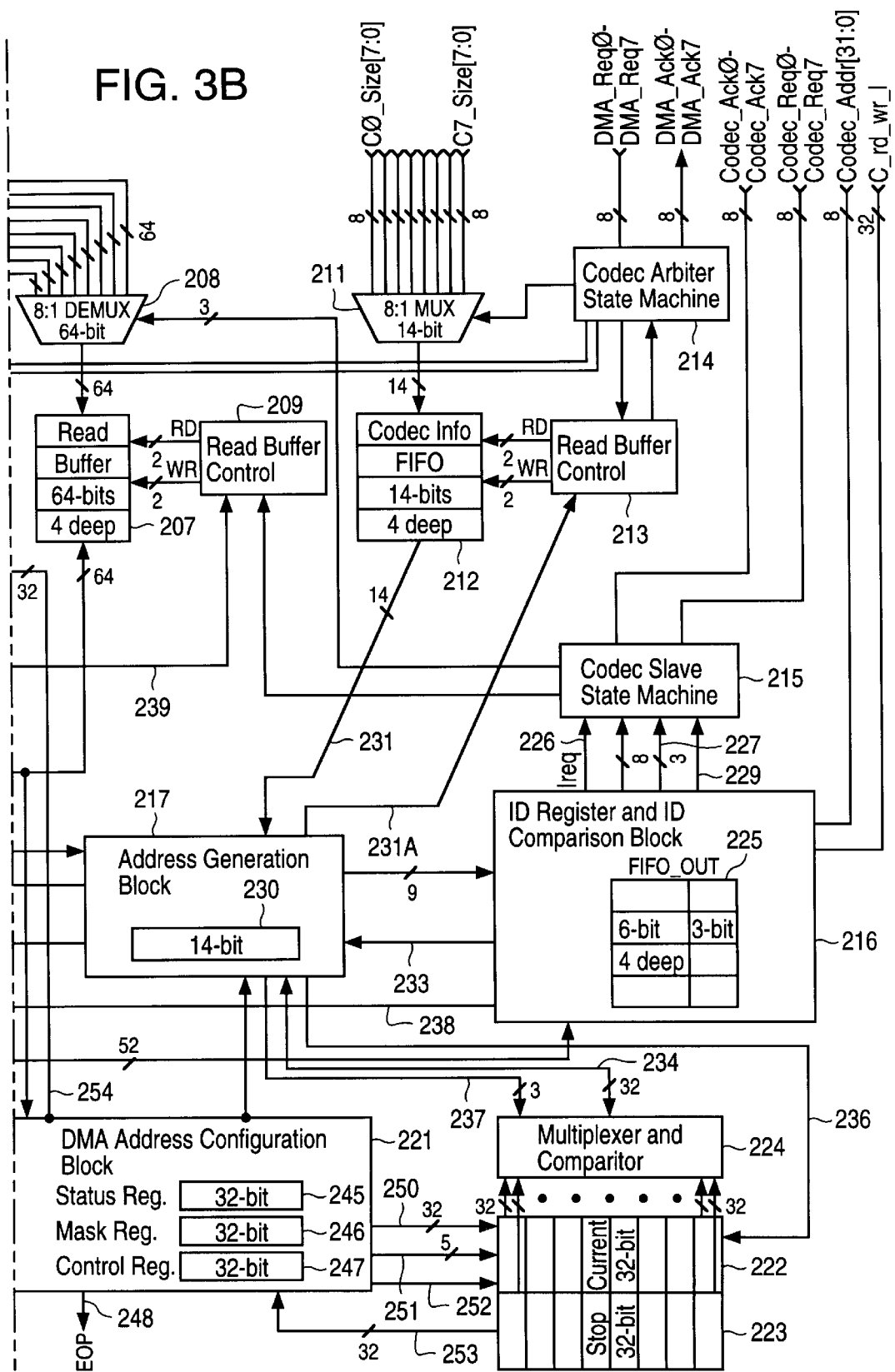

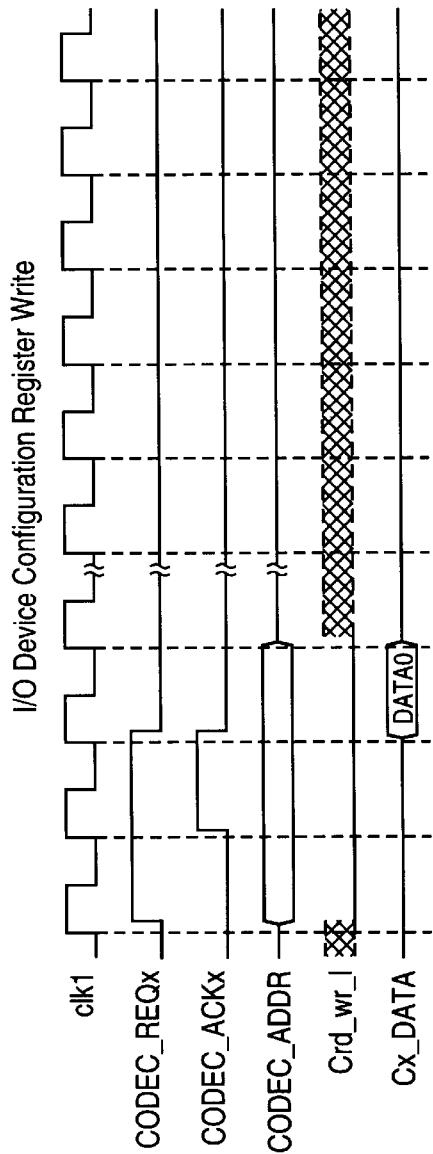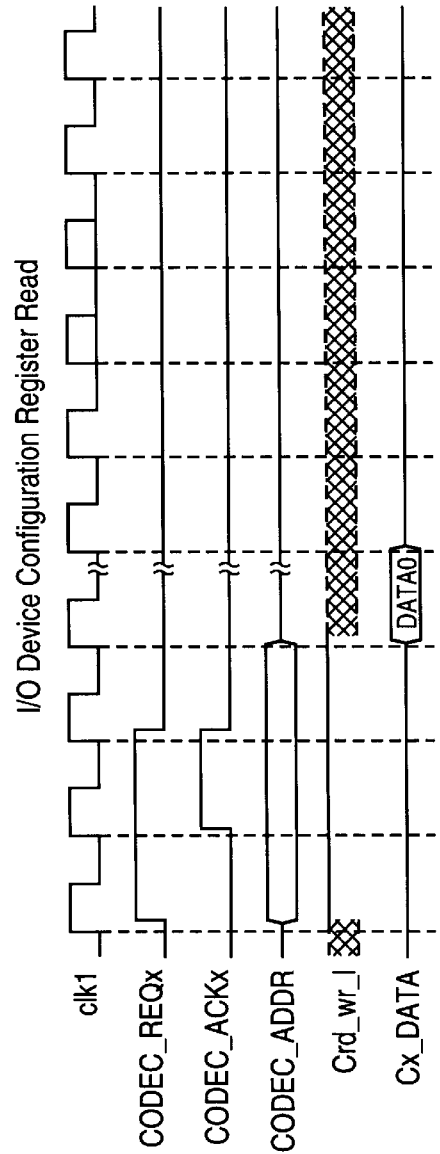

Codec Arbiter State Machine

Codec Slave State Machine

Address Generator Block State Machine

ID Register and ID Comparison Block State Machine

FBUS Master State Machine

FBUS Slave State Machine

DMA CONTROLLER WHICH RECEIVES SIZE DATA FOR EACH DMA CHANNEL

FIELD OF THE INVENTION

This invention relates to DMA (direct memory access) controller circuits.

BACKGROUND INFORMATION

FIG. 1 illustrates one possible multimedia system. Video data passes from camera 1, through video decoder and interface 2, through DMA (direct memory access) controller 3, through bus 4, and to memory block 5. Audio data passes from microphone 6, through audio decoder and interface 7, through two channel DMA controller 3, through bus 4 and to memory block 5. A processor 8 may, for example, processes the data stored in memory block 5. Camera 1 and video decoder and interface 2 together may be considered to comprise an I/O device 1A. Similarly, microphone 6 and audio decoder and interface 7 may be considered to comprise an I/O device 6A.

Consider an example in which audio data is to be passed from audio decoder and interface 7 to DMA controller 3. Audio decoder and interface 7 issues a DMA request signal to DMA controller 3 via DMA request line 9. When the DMA controller 3 is able to receive data from the audio decoder and interface 7, DMA controller 3 returns a DMA acknowledge signal on DMA acknowledge line 10. The audio decoder and interface 7 then transfers data over data lines 11. Assume that the DMA controller receives and latches eight consecutive words of data from data lines 11. The amount of data in the transfer may be appropriate for this channel which is used for audio data.

Consider further the example in which one frame of video data is to be passed from video decoder and interface 2 to DMA controller 3. Video decoder and interface 2 issues a DMA request signal to DMA controller 3 via DMA request line 12. When the DMA controller 3 is able to receive data from the video decoder and interface 2, DMA controller 3 returns a DMA acknowledge signal on DMA acknowledge line 13. The video decoder and interface 2 then transfers eight consecutive words of data over data lines 14 to DMA controller 3.

The video data path may, however, have higher bandwidth requirements than the audio data path. In the event that the video decoder and interface 2 still has additional data to pass to DMA controller 3, the video decoder and interface 2 issues another DMA request, waits for the DMA controller 3 to return another DMA acknowledge, and then transfers additional data to the DMA controller 3. Numerous time-consuming DMA request/DMA acknowledge sequences are therefore necessary to transfer the desired amount of data. A DMA controller is desired wherein a DMA channel can transfer either large amounts of data or small amounts of data to and/or from I/O devices, neither type of transfer involving a multiple DMA request/DMA acknowledge sequence.

SUMMARY

A DMA controller receives size data in association with a DMA request. If first size data is received, a first amount of data (for example, one word) is transferred through the DMA controller for the DMA request. If, on the other hand, second size data is received, then a second amount of data (for example, two words) is transferred through the DMA controller for the DMA request. In the event that a DMA request cannot be serviced when received, the DMA request is stored in the DMA controller for later servicing. Size data for a DMA request is stored so that the size of the data transfer will be known when the stored DMA request is serviced. Using this size data, a single DMA channel can support data transfers of different sizes. In some embodiments, size data is used to increment a DMA current address register by the correct amount after the data (the amount of data being indicated by the size data) is transferred through the DMA controller.

A DMA controller in one embodiment supports up to eight 64-bit DMA channels and interfaces to a high speed (approximately 100 MHz) 64-bit split transaction bus. An I/O device address bus is provided to support access to configuration registers in I/O devices through the DMA controller. The DMA controller may support channel linking to reduce the number of times a processor is interrupted by the DMA controller to reinitialize a current address register in the DMA controller. In some embodiments, the DMA controller has a current address register and a stop address register for each DMA channel but does not have a separate start address register.

This summary does not purport to define the invention. The invention is defined by the claims.

BRIEF DESCRIPTION OF THE DRAWINGS

FIG. 5C is a waveform diagram illustrating the writing of data into a configuration register of an I/O device through a DMA controller.

FIG. 5D is a waveform diagram illustrating the reading of data from a configuration register of an I/O device through a DMA controller.

DETAILED DESCRIPTION OF THE PREFERRED EMBODIMENTS

Figure 1:
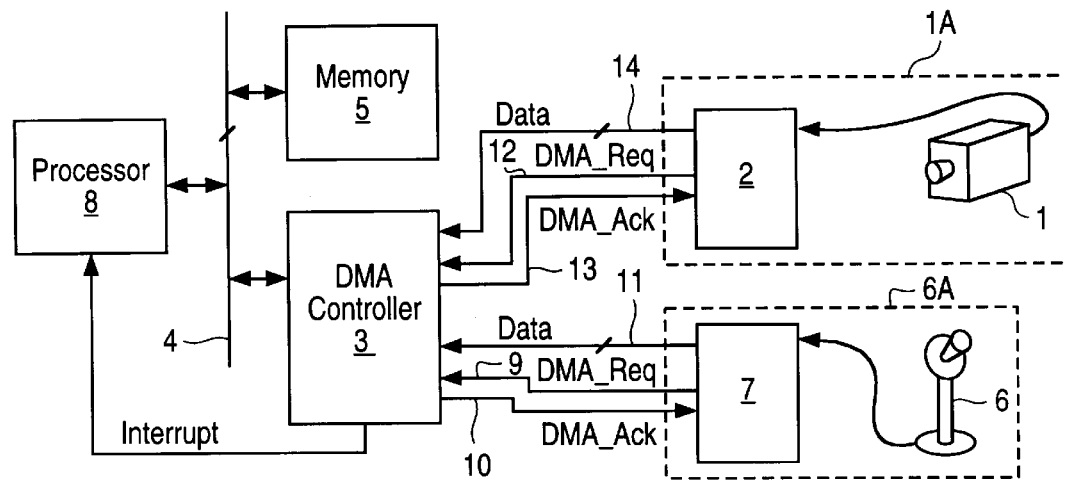
FIG. 1 illustrates a DMA controller which couples both a high bandwidth I/O device 1A and a low bandwidth I/O device 6A to a bus 4.
Figure 2:
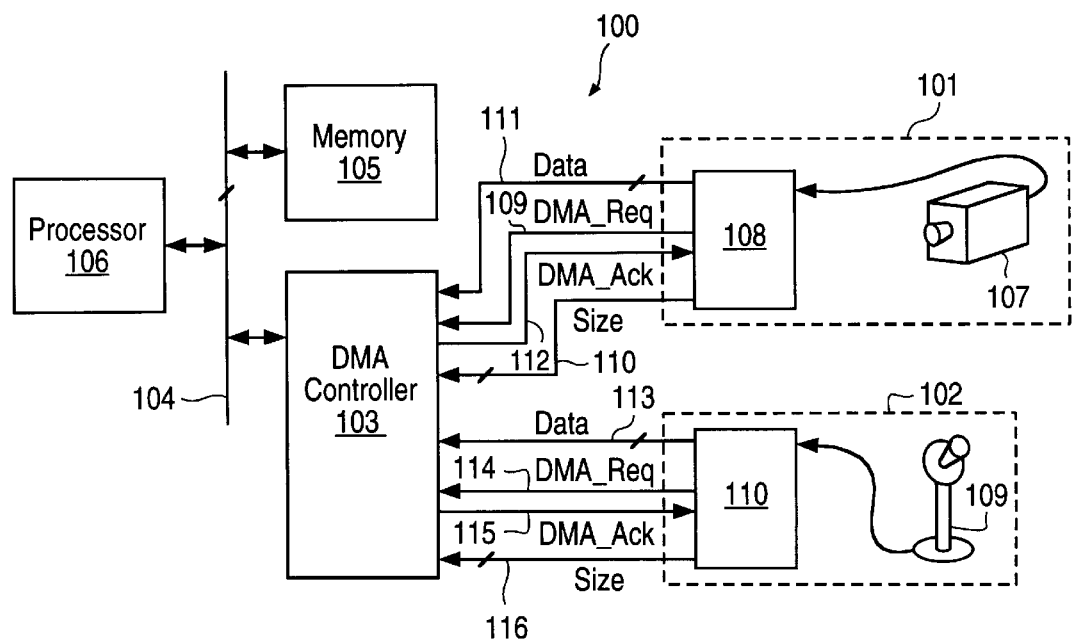
FIG. 2 is a simplified block diagram of a system in accordance with an embodiment of the present invention.

FIG. 2 is a simplified diagram of a system 100 in accordance with an embodiment of the present invention. System 100 includes a first I/O device 101, a second I/O device 102, a DMA controller circuit 103, a parallel bus 104, a memory block 105, and a processor 106. In one embodiment, I/O device 101 includes a video camera 107 and a video decoder and interface 108. Similarly, in one embodiment, I/O device 102 includes a microphone 109 and an audio decoder and interface 110. Although each of the I/O devices in the illustrated embodiment is an input-only device, each of the I/O devices could be an input-only device, an output-only device, or an input and output device. The KS0119 is a suitable video encoder, the KS0122 is a suitable video decoder, and the AD1843 is a suitable audio codec (encoder/decoder). In some embodiments, the interface portions of blocks 108 and 110 are integrated on the same integrated circuit with the DMA controller circuit 103. Memory block 105 may include an MCU (memory control unit) and SDRAM (synchronous dynamic random access memory).

Consider the example in which data from I/O device 101 is to be transferred to memory block 105 via DMA controller 103. I/O device 101 issues a DMA request to DMA controller 103 via DMA request line 109. The I/O device 101 also supplies size data to the DMA controller via size lines 110 to indicate how much data is to be transferred to the DMA controller via data lines 111. In the illustrated embodiment, there are sixty-four data lines 111 and eight size lines 110. If, for example, the I/O device 101 wishes to transfer four 64-bit words of data to the DMA controller 103 via data lines 111, then the size bits carry the digital value (20 h) indicating there are four words of data to be transferred.

When the DMA controller 103 is ready to receive data from I/O device 101, DMA controller 103 returns a DMA acknowledge signal to the I/O device 101 via DMA acknowledge line 112. When the I/O device 101 receives the DMA acknowledge signal, it supplies four consecutive 64-bit words of data to the DMA controller. Due to the size data received earlier, the DMA controller 103 knows to capture four words of data on the four consecutive clocks of a bus clock signal.

If, rather than transferring four words to DMA controller 103, I/O device 101 had only two 64-bit words of data to transfer to DMA controller 103, then I/O device 101 would have supplied a digital value (10 h) onto the size lines indicating there were two words of data to be transferred. In this way, a single DMA request may have either a transfer of a first amount of data (for example, four words) associated with it or may have a transfer of a second amount of data (for example, two words) associated with it. The amount of data transferred is indicated by size data on the size lines 110 (08 h indicates one word, 10 h indicates two words, 18 h indicates three words, and 20 h indicates four words). The lines 109, 110, 111, and 112 are together referred to as a first bus. A first DMA channel is said to exist between I/O device 101 and DMA controller 103.

Next, DMA controller 103 transfers the data to memory block 105 via a second bus 104. In some embodiments, second bus 104 has among other lines: thirty-two address lines, sixty-four data lines, eight size lines, ten transaction ID lines (four requester ID lines and six transaction request ID lines), three dedicated destination ID lines for each device on bus 104, two dedicated grant count lines for each device on bus 104, a dedicated bus request line for each device on bus 104, a dedicated bus grant line for each device on bus 104, a dedicated data FIFO full signal line for each device on bus 104, a dedicated address FIFO full signal line for each device on bus 104, and a bus clock line. One bit of the destination ID is a read or write operation.

In one embodiment, DMA controller 103 arbitrates for bus 104 and generates a 3-bit destination ID onto bus 104 indicative of the device with which it wishes to communicate (in this case memory block 105). A bus arbiter (not shown) for bus 104 uses the destination ID to monitor the ability of the memory block 105 to receive data. The bus arbiter may, for example, monitor the status of a data FIFO (first-in-first-out) buffer in the memory block 105. When the memory block 105 is able to receive data, the bus arbiter grants control of bus 104 to DMA controller 103 by outputting a bus grant signal to DMA controller 103 via a dedicated bus grant line for the DMA controller and then outputting a chip select signal to the memory block 105 via a dedicated chip select line.

In this case, the data from I/O device 101 is to be transferred to memory block 105 in four consecutive 64-bit words. The DMA controller 103 therefore outputs a grant count value to the bus arbiter indicating the number of bus cycles for which it is requesting that the bus arbiter assert the bus grant signal. In this example, DMA controller 103 outputs a digital "11" onto dedicated bus grant count lines.

With memory block 105 selected and the bus 104 granted to DMA controller 103 for the appropriate number of bus cycles, DMA controller 103 outputs an address for the first 64-bit word of data onto the bus 104 and outputs the first 64-bit word of data onto the data lines of bus 104. A 10-bit transaction ID is output onto the ten transaction ID lines of the bus 104 but this transaction ID is not necessary because the transfer in this case is not a split transaction. On the next consecutive three bus clock cycles, the next three 64-bit words of the data are output onto bus 104 and are loaded into the memory block 105. The DMA controller does not output addresses for these next three words. Memory block 105 handles loading the next words of data into the memory locations in the memory block following the supplied address.

The address output onto bus 104 by DMA controller 103 is determined using a current address register located in DMA controller 103 for the first DMA channel. This register is writable by processor 106. After the address is output onto the bus 104 and four words of data are supplied to the memory block 105, the current address register for the first DMA channel is incremented by thirty-two in accordance with the size of the transaction so that the next address to be written to memory block 105 will be written into the appropriate address location in memory block 105.

In the way that data can be transferred from I/O device 101 via the first DMA channel, so too can data be transferred from I/O device 102 via a second DMA channel. Data lines 113, DMA request line 114, DMA acknowledge line 115 and size lines 116 are part of a third data bus (second DMA channel) coupling the DMA controller 103 to the second I/O device 102.

Data can also be transferred from memory block 105 to first I/O device 101 (in this case data lines 111 transfer data to a video encoder in I/O device 101 and I/O device 101 includes a video display rather than a camera). I/O device 101 issues a DMA request on line 109 with the size data on size lines 110 indicative of the amount of data it is expecting to receive. DMA controller 103 then performs a "posted read" on bus 104. DMA controller 103 first arbitrates for bus 104 using its request line, grant count lines and destination ID lines. The DMA controller 103 is granted control of the bus 104, and memory block 105 is selected even if memory block 105 is not able to return the desired data. DMA controller 103 issues a read request to memory block 105 using the current address register for the first DMA channel and a transaction request ID and then relinquishes control of the bus 104. DMA controller 103 also stores the transaction request ID in association with the DMA channel that requested the data.

Memory block 105 uses the size data and the address on bus 104 to determine what data is being requested by the DMA controller. When memory block 105 is ready to transfer the requested data back to the DMA controller 103, memory block 105 arbitrates for the bus. The destination ID is the requester ID used by DMA controller (a part of the transaction ID which was passed to the memory block by the DMA controller as part of the read request). When the memory block 105 obtains control of the bus 104 and the bus arbiter selects the DMA controller 103 as the destination, the data is passed from the memory block 105 to the DMA controller 103 in an appropriate number of consecutive bus clock cycles. The memory block 105 does not drive the address lines but does return the transaction request ID passed to it by the DMA controller in the read request. DMA controller 103 uses the returned transaction request ID to determine the DMA channel to which the associated data is to be supplied. In this example, the returned transaction request ID indicates that the data is to be supplied to I/O device 101. DMA controller 103 therefore issues a codec request signal to I/O device 101 via a codec request line Codec_Req (not shown) and waits for the I/O device to indicate that it is ready to receive data. When the I/O device is ready to receive data from the DMA controller, it sends a codec acknowledge signal to the DMA controller via a codec acknowledge line Codec_Ack (not shown). When DMA controller 103 receives this signal, it supplies the data to I/O device 101 in a number of words determined by the size data.

Although a particular type of bus 104 with a particular bus arbitration scheme is set forth in the above example, other types of buses and other arbitration schemes can be used for bus 104. Bus 104 need not support posted read operations, need not carry transaction IDs, need not include size lines, and need not include grant count bus lines. Bus 104 may have a different number of data lines than the buses of the DMA channels have.

Figure 3A:
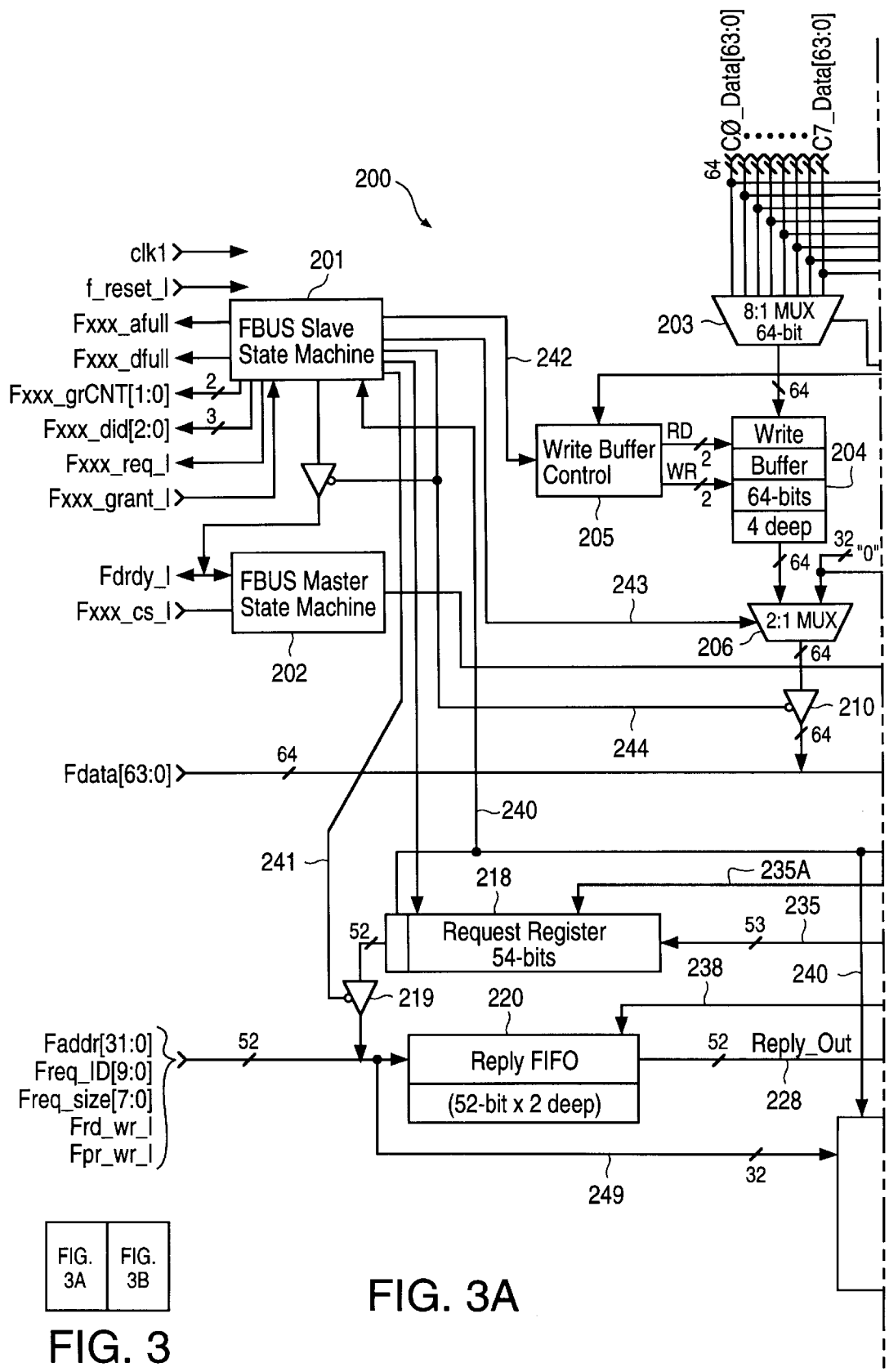
FIG. 3 (3A–3B) is a simplified block diagram of a DMA controller in accordance with a specific embodiment of the present invention.

FIG. 3 is a simplified block diagram of a DMA controller 200 in accordance with a specific embodiment. DMA controller 200 includes an FBUS slave state machine 201, an FBUS master state machine 202, an eight-to-one 64-bit multiplexer 203, a 64-bit wide by 4-word deep write buffer 204, a write buffer control circuit 205, a two-to-one 64-bit multiplexer 206, a 64-bit wide by 4-word deep read buffer 207, an eight-to-one 64-bit demultiplexer (encoder) 208, a read buffer control circuit 209, a 64-bit wide tri-statable buffer 210, an eight-to-one 8-bit multiplexer 211, a 14-bit wide by 4-word deep codec information FIFO 212, a codec information FIFO control circuit 213, a codec arbiter state machine 214, codec slave state machine 215, an ID register and ID comparison block 216, an address generation block 217, a 54-bit request register 218, a 52-bit tri-statable buffer 219, a 52-bit wide by 2-word deep reply FIFO 220, a DMA address configuration block 221, eight 32-bit current address registers 222, eight 32-bit stop address registers 223, and a 32-bit wide multiplexer and comparator block 224.

DMA controller 200 supports up to eight DMA channels. A first bus, for example, may couple the DMA controller to a first I/O device. Such an I/O device may include a codec and a codec interface block coupling the codec to the first bus. The first bus includes a 64-bit codec data bus C0_Data [63:0], a 32-bit codec address bus Codec_Addr[31:0] to access codec configuration registers, an 8-bit size bus C0_Size[7:0], a DMA request line DMA_Req0, a DMA acknowledge line DMA_Ack0, a codec request line Codec_Req0, a codec acknowledge line Codec_Ack0 and a codec read/write line C_rd_wr_1 to access codec configuration registers. For additional details, see the U.S. Patent Applications entitled "Full Duplex Serial Codec Interface With DMA Access" (Ser. No. 08/730,864) U.S. Pat. No. 5,889,680 and "Video Interface And Overlay System And Process" (Ser. No. 08/733,905) by Hoyoung Kim filed Oct. 18, 1996. The subject matter of these two applications is incorporated herein by reference.

DMA controller 200 has an interface for coupling to a second bus called the FBUS. In this embodiment, the second bus is a non-address/data multiplexed bus which includes: a bus clock line clk1, a bus reset line f_reset_1, an address FIFO full signal line Fxxx_afull, a data FIFO full signal line Fxxx_dfull, two grant count lines Fxxx_grCNT[1:0], three destination ID lines Fxxx_did[2:0], a bus request line Fxxx_req_1, a bus grant line Fxxx_grant_1, a data ready signal line Fdrdy_1 which is asserted by the source of the data, a chip select signal Fxxx_cs_1, sixty-four data lines Fdata[63:0], thirty-two address lines Faddr[31:0], ten transaction ID lines Freq_ID[9:0] (bits [9:6] carry a requester ID whereas bits [5:0] carry a transaction request ID), eight size lines Freq_size[7:0], a partial read indicator line Fpr_wr_1 and a read/write line Frd_wr_1. The "xxx" above indicates that the signal line is a dedicated line for the DMA controller and that other such dedicated lines exist for other devices on the FBUS. Fmem_cs_1, for example, is the dedicated chip select line leading from the bus arbiter to the memory block on the FBUS.

If the second bus (the FBUS) is busy and the DMA controller 200 cannot access the FBUS to complete the transaction, the DMA controller 200 can nonetheless receive and acknowledge additional DMA requests. Codec information FIFO 212 stores information for up to four DMA requests. When a DMA request is received and acknowledged, a 3-bit codec ID is generated which is indicative of the particular DMA request line upon which the DMA request signal was received. This 3-bit codec ID is stored in the codec information FIFO 212 along with: 1) the 8-bit size data from the codec size lines associated with that DMA request line, 2) two read/write bits which indicate whether the DMA channel is a read channel or a write channel, and 3) a valid bit which indicates whether the word in the codec information FIFO is valid (i.e., the valid bit is set to "1" when the DMA request is received and is reset to "0" after the information from the codec information FIFO 212 has been transferred to the address generation block 217 to generate the FBUS address for the DMA request)

When the address for an entry in codec information FIFO 212 is to be generated, the 3-bit codec ID in the entry is used to select the 32-bit current address register 222 for the DMA channel that generated the DMA request. This 32-bit address and the size data stored in the codec information FIFO 212 is supplied to the FBUS via address generation block 217 and request register 218. Once used, the current address register is incremented a number of times depending on the size data of the DMA request.

A 6-bit transaction request ID is also generated in ID register and ID comparison block 216 for this transaction (this transaction request ID can, for example, be the output of a counter which is incremented for each successive read bus transaction). The 6-bit transaction request ID is supplied to the FBUS via the address generation block 217 and request register 218 and is also stored in a FIFO__OUT FIFO 225 along with the associated 3-bit codec ID.

Consider the example where the requested FBUS transaction is a posted read. The destination device on the FBUS with the data will return the 6-bit transaction request ID along with the requested data. The 6-bit transaction request ID is received into the reply FIFO 220 along with the data and is compared with the 6-bit transaction request ID entries in the FIFO__OUT FIFO 225 in ID register and ID comparison block 216. The 3-bit codec ID stored with the matching 6-bit transaction request ID is then used by the codec slave state machine 215 to generate a codec request signal on line Codec_ReqO to indicate to the requesting DMA channel that data is available. When the I/O device for this DMA channel is ready to receive the data, it responds with an acknowledge on its Codec_Ack0 line. The codec slave state machine 215 then uses the 3-bit codec ID to control demultiplexer (sometimes called an encoder) 208 such that the data is supplied to the correct DMA channel.

Figure 4:
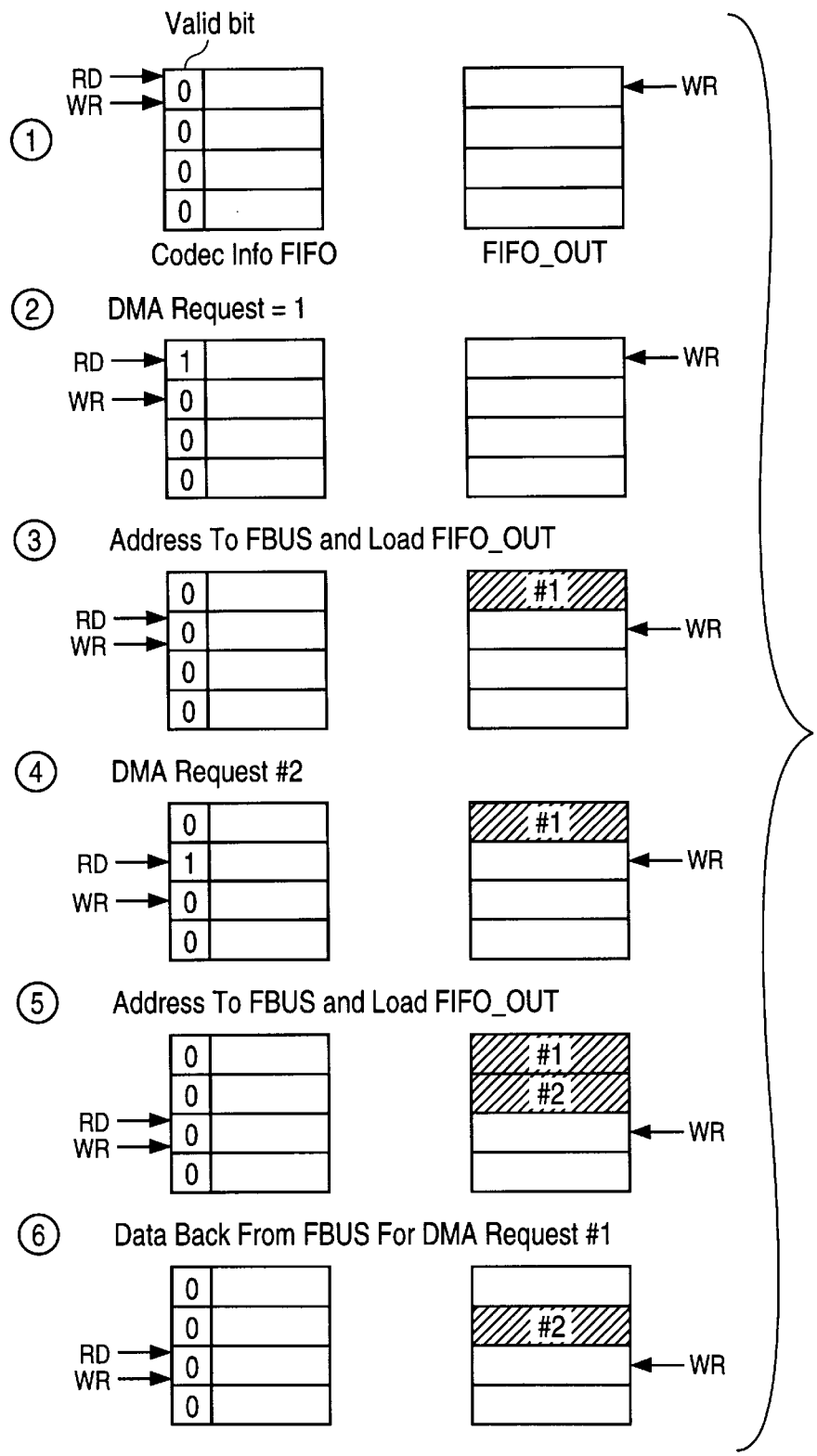
FIG. 4 is a diagram illustrating operation of a codec information FIFO and a FIFO_OUT FIFO in a specific embodiment of a DMA controller.

FIG. 4 is a simplified diagram illustrating an example of how the codec information FIFO 212 and the FIFO__OUT FIFO 225 are incremented in one embodiment. Initially (circle 1), the read and write pointers of the codec information FIFO 212 are both pointing to the first word, and the valid bits of each word is in the reset state "0" indicating that there are no entries in the codec information FIFO 212. Next (circle 2), a first DMA request is received. The read/write bits, codec ID bits and codec size bits are loaded into the first word pointed to by the write pointer, the valid bit is set indicating that a valid entry is present, and the write pointer is incremented. Throughout this time there are no reads posted, so the contents of each of the words of the FIFO__OUT FIFO 225 are in the cleared state (all zeros). Next (circle 3), the word in the codec information FIFO 212 pointed to by the read pointer is used to generate an address onto the FBUS. After the word is used, the read pointer is incremented and the valid bit for the used word is cleared. A transaction request ID is generated, is loaded into the FIFO__OUT FIFO 225 (along with the codec ID), and is supplied to the FBUS, and the write pointer of the FIFO__OUT FIFO 225 is moved as illustrated. Next (circle 4), a second DMA request is received. The read/write bits, codec ID bits and codec size bits are loaded into the second word pointed to by the write pointer, the valid bit is set, and the write pointer is incremented. Next (circle 5), the word in the codec information FIFO pointed to by the read pointer is used to generate an address onto the FBUS. After the word is used, the read pointer is incremented and the valid bit for the used word is cleared. A second transaction request ID is generated, is loaded into the FIFO__OUT FIFO 225 at the location pointed to by the write pointer, and is supplied to the FBUS, and the write pointer of the FIFO__OUT FIFO 225 is moved as illustrated. When the data for the first DMA request is received from the FBUS (circle 6), the transaction request ID for that data is matched with the entries in the FIFO__OUT FIFO 225. When the transaction request ID of the first entry in the FIFO__OUT FIFO 225 matches, the codec ID stored in that entry is used to supply the received data to the correct DMA channel. Once used, the word of the FIFO__OUT FIFO entry is cleared.

Figure 5A:
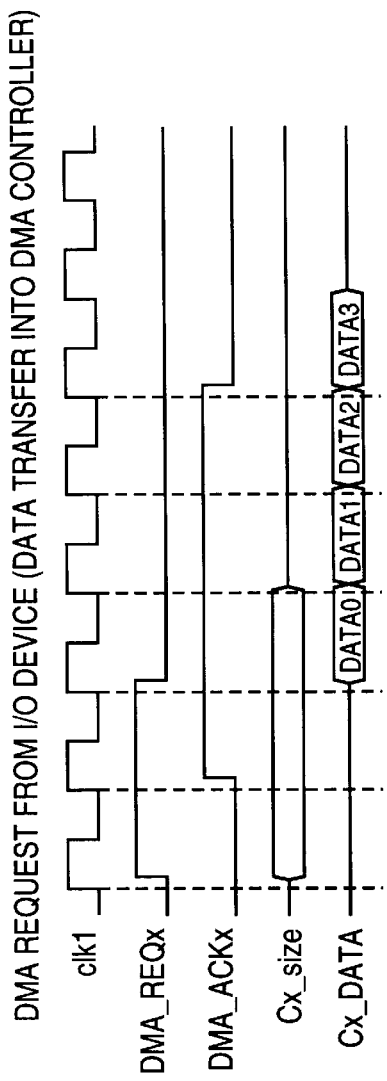
FIG. 5A is a waveform diagram illustrating a data transfer from an I/O device and into a DMA controller in response to a DMA request.

FIG. 5A is a waveform diagram illustrating the receipt of a DMA request for a data transfer from an I/O device and into a DMA controller. The size data on lines Cx_size[7:0] indicates four-words of data. In response to a single DMA request and DMA acknowledge sequence, the four words of data are transferred from I/O device to DMA controller in four consecutive bus clock cycles, one word each cycle, as illustrated.

Figure 5B:
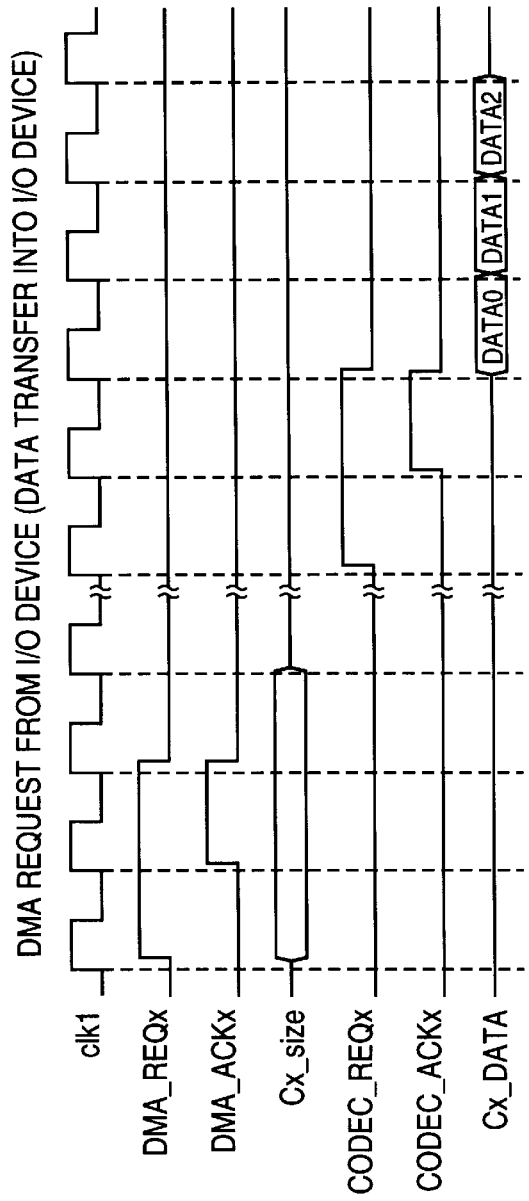
FIG. 5B is a waveform diagram illustrating a data transfer from a DMA controller and into an I/O device in response to a DMA request.

FIG. 5B is a waveform diagram illustrating the receipt of a DMA request for a data transfer from a device on the FBUS to an I/O device through the DMA controller. In this case, the size data associated with the DMA request indicates three-words of data. When the DMA controller receives the data from the FBUS, the DMA controller issues a codec request to the I/O device. After the I/O device indicates it is ready to receive data by returning a codec acknowledge signal, the data is supplied to the I/O device in three consecutive bus clock cycles, one word each cycle, as illustrated.

Figure 6A:
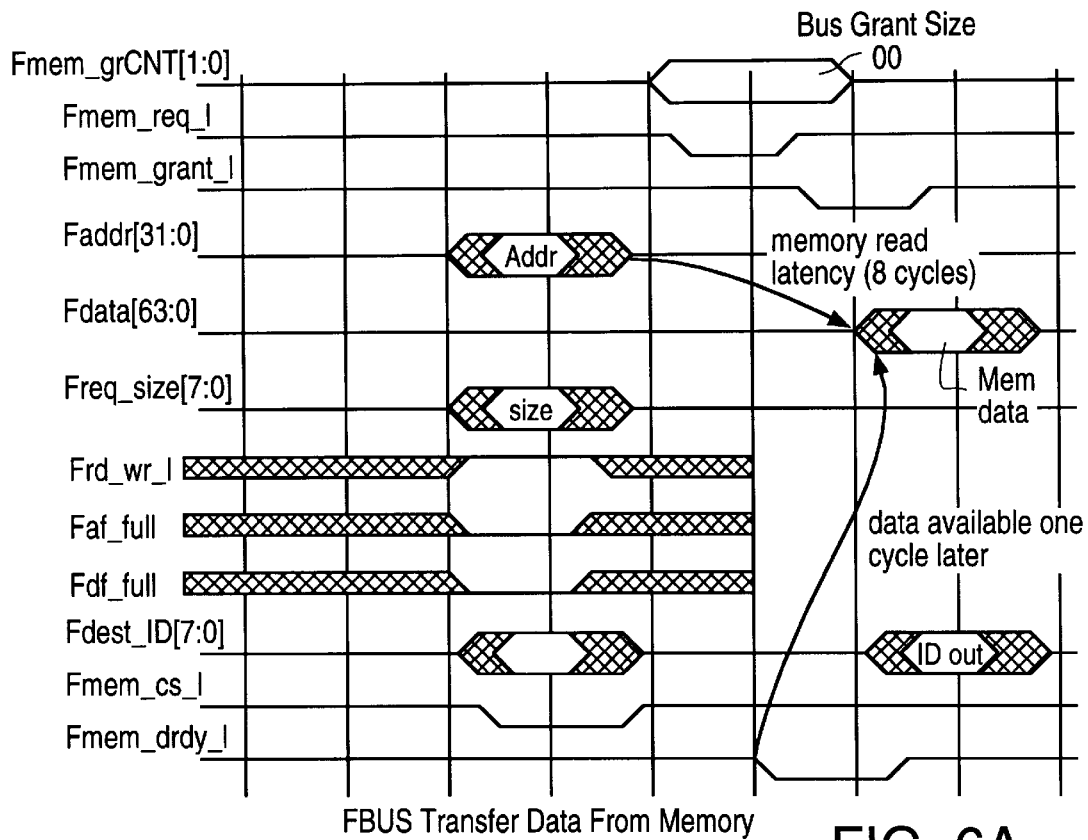
FIG. 6A is a waveform diagram illustrative of a transfer of data from a device on the FBUS to a DMA controller.

FIG. 6A is a waveform diagram illustrative of a transfer of data from a device on the FBUS (i.e., memory block) to DMA controller 200. The amount of data transferred in this example is one 64-bit word.

Figure 6B:
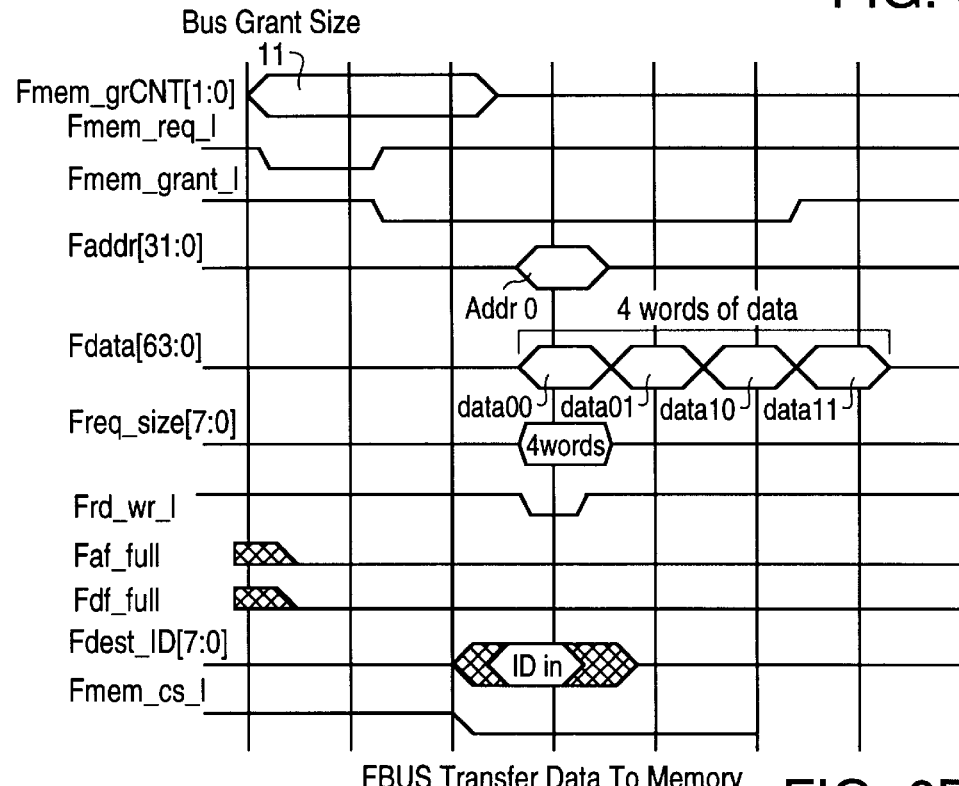
FIG. 6B is a waveform diagram illustrative of a transfer of data from a DMA controller to a device on the FBUS.

FIG. 6B is a waveform diagram illustrative of a transfer of data from DMA controller 200 to a device on the FBUS (i.e., memory block). The amount of data transferred in this example is four 64-bit words.

Figure 7A:
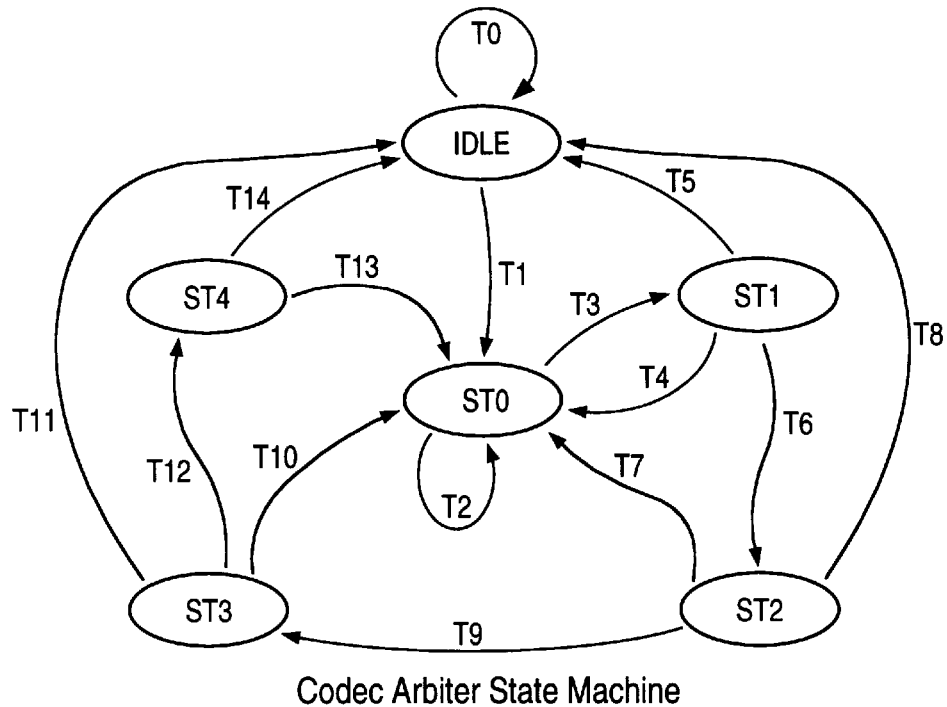
FIGS. 7A–7G are state diagrams illustrative of the operation of various blocks of the DMA controller of FIG. 3. For instructional purposes, the accompanying operational descriptions are simplified to clarify the descriptions of the state diagrams.

FIG. 7A is a state diagram illustrative of an operation of the codec arbiter state machine 214 of FIG. 3. To support a high performance video codec, the KS0119, channel 0 is assigned a fixed priority (the highest priority) and the other DMA channels are arbitrated using a Round Robin scheme. Another state machine (not shown) handles the support of channel 0. In some embodiments, a direct data path between a memory control unit on the FBUS and the DMA controller is provided to avoid having to pass data for DMA channel 0 through the FBUS. For additional details, see the U.S. patent application Ser. No. 08/730,915 entitled "A Priority Request and Bypass Bus", by Amjad Z. Qureshi, filed Oct. 18, 1996 (the subject matter of which is incorporated herein by reference).

Figure 8:
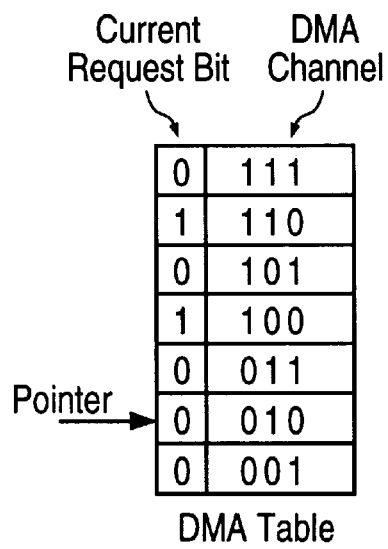
FIG. 8 is diagram of a DMA table which is illustrative of the operation of an embodiment of the codec arbiter state machine block of the DMA controller of FIG. 3.

In FIG. 7A, transition T0 occurs if there is no DMA request received or if the state machine for channel 0 is busy. In the IDLE state, no DMA request is being serviced. Transition T1 occurs if a DMA request is received other than for channel 0. In state ST0, a 3-bit DMA pointer is moved up in a DMA table. FIG. 8 illustrates one possible DMA table. A "1" in the leftmost column of the table indicates that a DMA request is pending for the channel indicated by the 3-bit value to the right. The DMA pointer is only moved upward in this example. Transition T2 occurs if the current request bit is a "0". Transition T3 occurs if the current request bit is a "1". In each of states ST1, ST2, ST3 and ST4, a 64-bit word of data is transferred either into or out of the DMA controller via the codec data lines of the DMA channel indicated by the 3-bit value in the entry of the DMA table pointed to by the DMA pointer. A DMA acknowledge signal is asserted in state ST0 and is held asserted in states ST1, ST2, ST3 and ST4. Transition T6 occurs if the transfer is more than a one-word transfer. Transition T9 occurs if the transfer is more than a two-word transfer. Transition T12 occurs if the transfer is more than a three-word transfer. Transitions T5, T8, T11 and T14 occur if all the DMA request bits in the table are "0". Transitions T4, T7, T10 and T13 occur if any DMA request bit in the table is a "1".

Figure 7B:
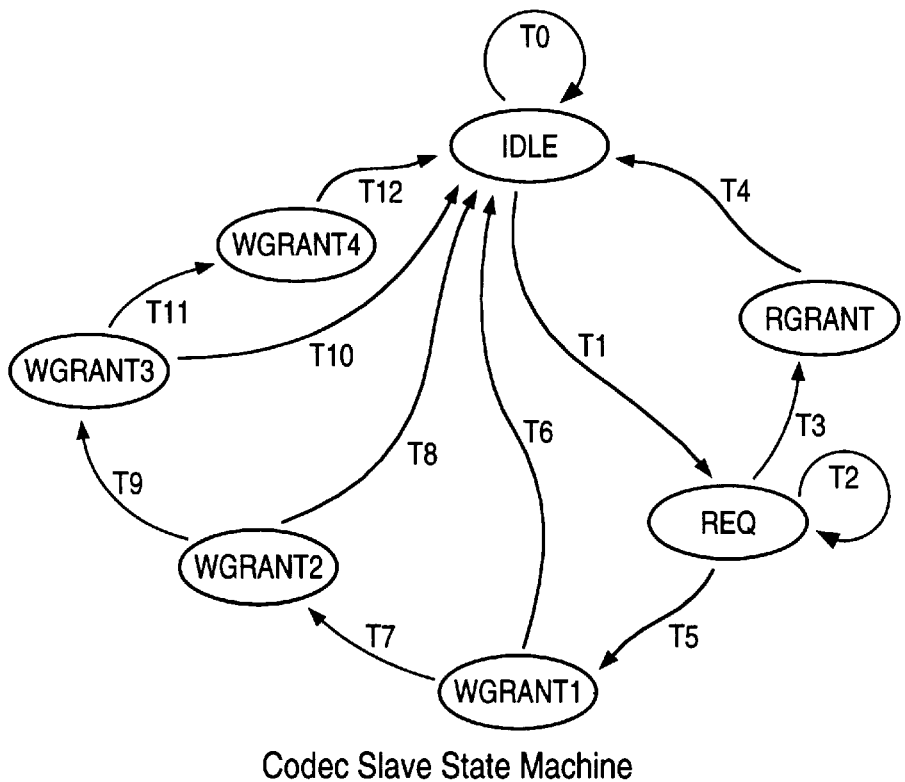

FIG. 7B is a state diagram illustrative of an operation of the codec slave state machine 215 of FIG. 3. If the internal request signal Ireq 226 (see FIG. 3) is not asserted by the ID register and ID comparison block 216 indicating a match of a received transaction request ID, then transition T0 occurs. If the Ireq signal 226 is asserted, however, then transition T1 occurs. In state REQ, a codec request is sent to the DMA channel indicated by the codec ID supplied on lines 227 by the ID register and ID comparison block 216. Transition T2 occurs if an acknowledge signal is not received from the DMA channel indicated by the codec ID. Transition T5 occurs if a codec acknowledge signal is received from the DMA channel indicated by the codec ID. In state WGRANT1, the first word of data is sent to the indicated DMA channel via its Cx_Data[63:0] lines. Transition T6 occurs if the transfer is a one-word transfer. Transition T7 occurs if the transfer is more than a one-word transfer. In state WGRANT2, a second word of data is sent to the indicated DMA channel. Transition T8 occurs if the transfer is a two-word transfer. Transition T9 occurs if the transfer is more than a two-word transfer. In state WGRANT3, a third word of data is sent to the indicated DMA channel. Transition T10 occurs if the transfer is a three-word transfer. Transition T11 occurs if the transfer is more than a three-word transfer. In state WGRANT3, a fourth word of data is sent to the indicated DMA channel. Transition T12 returns the state machine to the IDLE state.

If, for example, it is desired that a processor on the FBUS is to read from a codec interface (for example, a configuration register in a codec interface), then transition T3 occurs from state REQ. In state RGRANT, an address received from the FBUS is sent to the indicated DMA channel via the reply FIFO 220, Reply_Out bus 228 and a register (not shown) in the ID register and ID comparison block 216. The address is sent to the codec interface block on lines Codec_Addr[31:0] at the same time that a codec request is sent to the codec interface block on line Codec_Reqx. The DMA controller controls line C_rd_wr_1 to indicate a read. The addressed codec interface returns the data to the DMA controller write buffer 204 via its 64-bit codec data bus.

If, on the other hand, the processor on the FBUS is to write to a codec interface (for example, a configuration register), then states REQ, WGRANT1 are transitioned. The data to be written is transferred into the read buffer 207 by the FBUS master state machine 202 before state WGRANT1 so that the data is in the read buffer and can be transferred to the codec interface in state WGRANT1. The address from the FBUS is supplied to Codec_Addr[31:0] lines in state REQ. The line C_rd_wr_1 is controlled to indicate a write.

FIG. 5C is a waveform diagram illustrating a processor on the FBUS writing to a configuration register in a codec interface block of an I/O device using the Codec_Addr[31:0] bus. FIG. 5D is a waveform diagram illustrating a processor on the FBUS reading from a configuration register in a codec interface block of an I/O device using the Codec_Addr[31:0] bus.

Figure 7C:
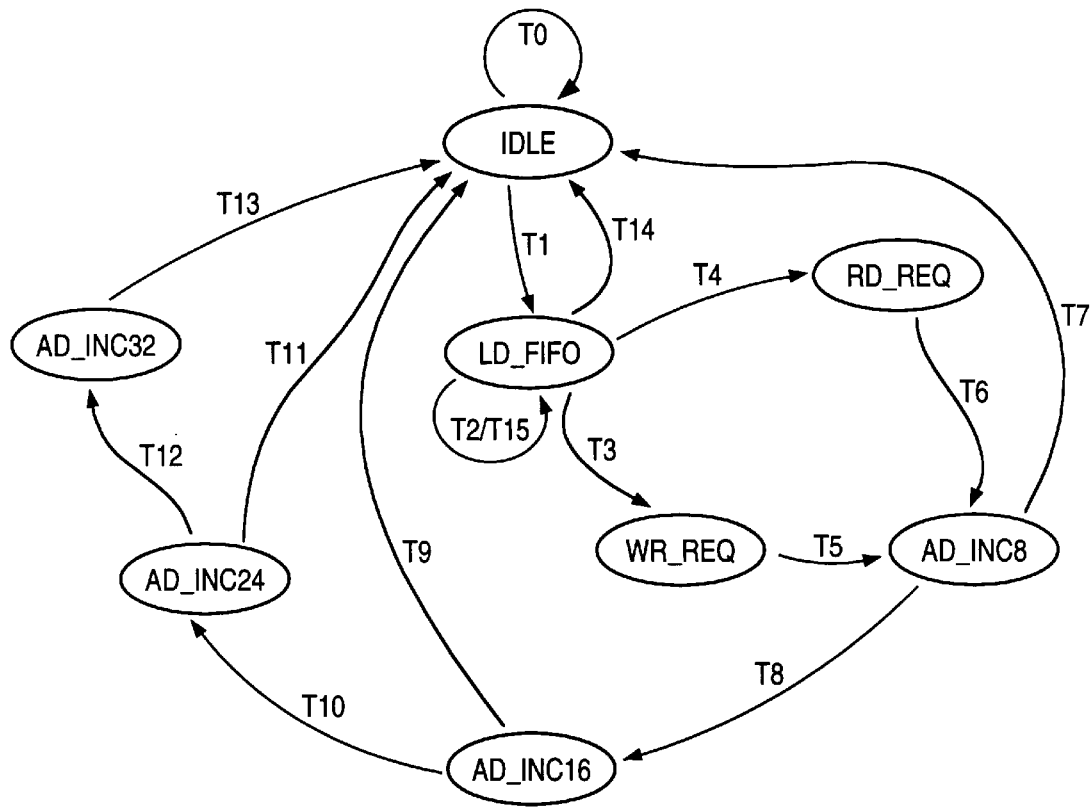

FIG. 7C is a state diagram illustrative of an operation of the address generation block state machine 217 of FIG. 3. Transition T0 occurs if all valid bits in the codec information FIFO 212 are "0" indicating there are no pending DMA requests. Transition T1 occurs if any valid but in the codec information FIFO 212 is a "1". In state LD_FIFO, 14-bit data from an entry in the codec information FIFO 212 with a valid bit of "1" is read into a 14-bit register 230 in the address generation block 217 via data lines 231 and a read enable line 231A. Transition T2/T15 occurs if the request register 218 or the FIFO_OUT FIFO 225 is full as indicated by full signals on lines 240 and 233. Transition T3 occurs if the read/write bits in the codec information FIFO entry indicate a write, and transition T4 occurs if the read/write bits in the codec information FIFO entry indicate a read. In state WR_REQ, an FBUS write data request is generated (the appropriate current address register is selected using three select lines 237) and is loaded via a load signal 235A into the request register 218 via lines 234 and 235. Similarly, an FBUS read data request is generated in state RD_REQ. Transitions T6 and T5 occur one clock cycle later. In state AD_INC8, the address of the selected current address register is incremented by eight (the FBUS address is the address of the first byte of the 64-bit FBUS data word) under the control of the increment enable line 236. If the transfer is a one-word transfer as indicated by the size data from the codec information FIFO 212, then transition T7 occurs back to the IDLE state. If, on the other hand, the transfer is for more than one word, then transition T8 occurs. In state AD_INC16, the selected current address register is incremented again by eight. If the transfer is a two-word transfer, then transition T9 occurs, otherwise transition T10 occurs. In state AD_INC24, the selected current address register is incremented again by another eight. If the transfer is a three-word transfer, then transition T11 occurs, otherwise transition T12 occurs. In state AD_INC32, the selected current address register is incremented again incremented by eight. Transition T13 occurs one clock cycle later.

Figure 7D:
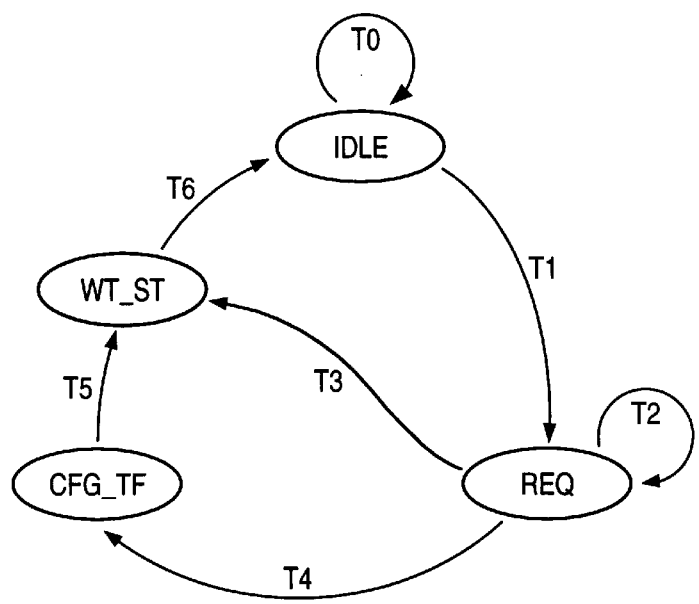

FIG. 7D is a state diagram illustrative of an operation of the ID register and ID comparison block 216 of FIG. 3. An address from the reply FIFO 220 is decoded in the ID register and ID comparison block 216 to generate a signal indicative of whether the operation is a configuration register read operation. Transition T0 occurs if the reply FIFO 220 is empty or if the write buffer 204 is full for an I/O device configuration register read operation. Transition T1 occurs if the reply FIFO 220 is not empty and either the operation is not an I/O configuration register read or the write buffer 204 is not full for an I/O device configuration register read operation. In state REQ, the ID register and ID comparison block 216 asserts the signal Ireq 226 so that the codec slave state machine 215 will start handling the transaction. Transition T3 occurs if there is a responding acknowledge from one of the Codec_Ackx lines when the operation is not an I/O device configuration register read. Transition T4 occurs if there is a responding acknowledge from one of the Codec_Ackx lines when the operation is an I/O device configuration register read. In state CFG_TF, data from the configuration register in the I/O device is loaded into the DMA controller via lines Cx_Data[63:0]. After the transaction has occurred, transition T5 occurs, and a clear signal is sent to the reply FIFO 220 via clear line 238 in state WT_ST. One clock cycle later, transition T6 occurs to return to state IDLE.

Figure 7E:
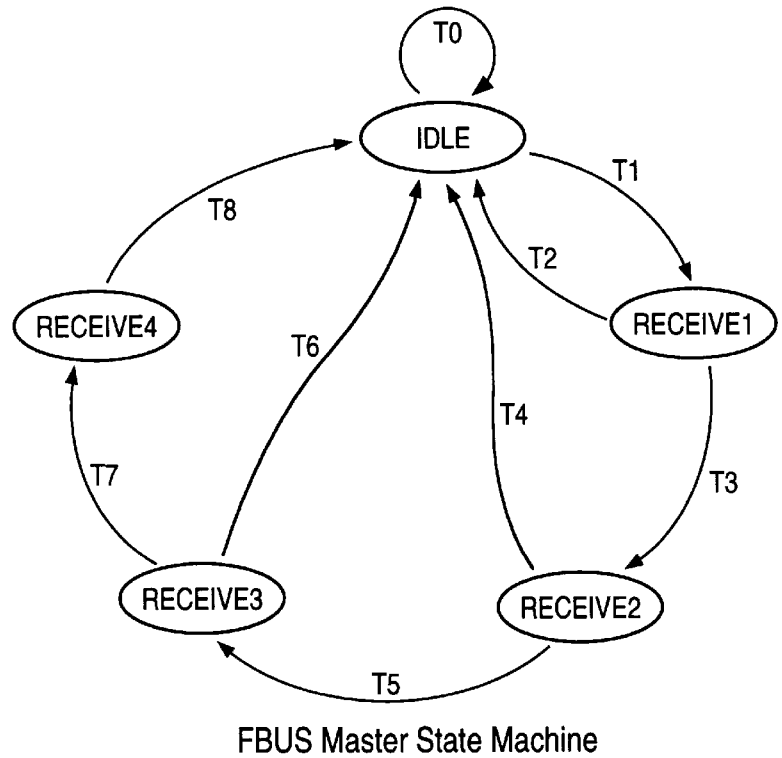

FIG. 7E is a state diagram illustrative of an operation of the FBUS master state machine 202 of FIG. 3. The FBUS data ready signal Fdrdy_1 is asserted by the device on the FBUS which is supplying the data onto the FBUS. The signal Fdrdy_1 is low (asserted) for the number of bus cycles for which there is data available on the FBUS to be latched. Transition T0 occurs if Fdrdy_1 is not asserted and transition T1 occurs if Fdrdy_1 is asserted. In state RECEIVE1, the FBUS master state machine 202 outputs a load_fdata signal on line 239 to cause one 64-bit word of data from the FBUS data lines Fdata[63:0] to be read into read buffer 207. The read buffer control circuit 209 then increments the write pointer of the read buffer 207. Transition T2 occurs if the Fdrdy_1 signal is no longer asserted when the FBUS arbiter is still asserting the chip select Fxxx_cs_1 for the DMA controller. If there is more data ready on the FBUS, and the Fdrdy_1 signal is still asserted, transition T3 occurs. In state RECEIVE2, FBUS master state machine 202 outputs another load_fdata signal on line 239 to cause another 64-bit word of data from the FBUS data lines Fdata[63:0] to be read into read buffer 207. The read buffer control circuit 209 then increments the write pointer of the read buffer 207. If there is more data ready to be received as indicated the signal Fdrdy_l still being asserted, transition T5 occurs. Otherwise transition T4 occurs to return to the IDLE state. States RECEIVE3 and RECEIVE4 are similar to state RECEIVE2 in that another word of data is loaded into the read buffer 207 in each state as controlled by the signal load_fdata on line 239.

Figure 7F:
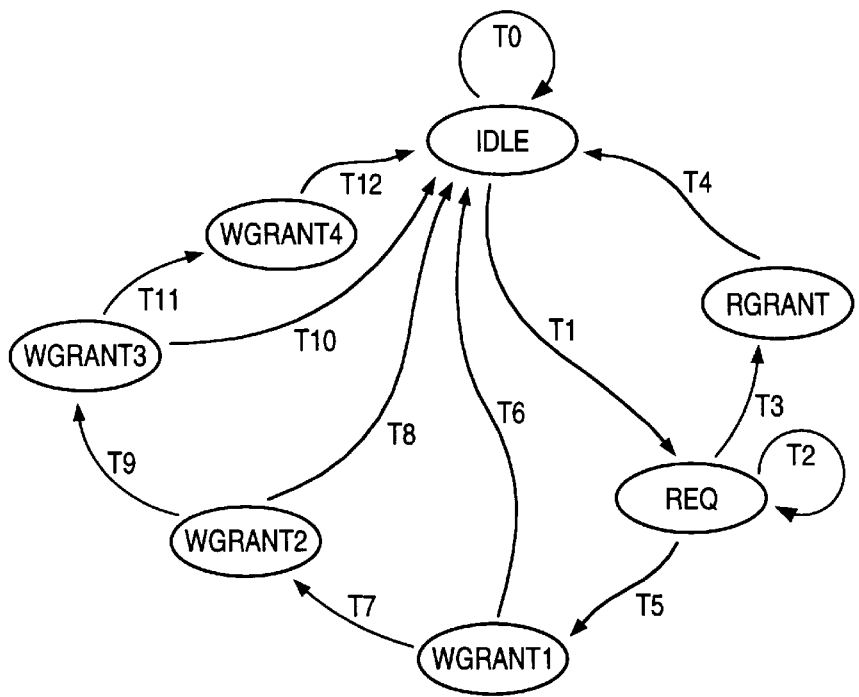

FIG. 7F is a state diagram illustrative of an operation of the FBUS slave state machine 201 of FIG. 3. When the address generation block 217 loads an address into the request register 218, the first bit of the request register (the valid bit bit[53]) is set. The FBUS slave state machine 201 monitors this valid bit via line 240. If the bit is not set, then transition T0 occurs. If the bit is set, then transition T1 occurs. In state REQ, the DMA controller 200 issues a bus request to the FBUS arbiter (not shown) to arbitrate for the bus. Transition T2 occurs if the FBUS arbiter does not grant the FBUS to the DMA controller via FBUS line Fxxx_grant_l. If the FBUS arbiter does grant control to the DMA controller (Fxxx_grant_l is asserted), then two transitions T3 and T5 are possible depending on whether the operation is a read or a write. The address generation block 217 loads bit[52] in the request register 218, and FBUS slave state machine 201 monitors this bit to determine whether the operation is a read or write. If the operation is a read, transition T3 occurs. Otherwise, transition T5 occurs. In state RGRANT, the FBUS slave state machine 201 causes a read request to be output from the request register 218 onto the FBUS via control line 241. The FBUS slave state machine 201 then clears the valid bit (bit[53]) in the request register 218 thereby indicating that the request register is available (i.e. empty).

In state WGRANT1, on the other hand, the operation is a write as indicated by the value of bit[52] in the request register 218. Address and data are therefore driven onto the FBUS. One 64-bit word of data is transferred from the write buffer 204 to the data lines Fdata[63:0] of the FBUS under the control signals on lines 242, 243 and 244. The address for the write operation is enabled onto the FBUS address lines Faddr[31:0] by an enable signal on line 241 and the valid bit (bit[53]) of the request register 218 is cleared. The read pointer of write buffer 204 is then incremented by the write buffer control circuit 205.

If the FBUS slave state machine 201 was granted the FBUS for the transfer of only one word of data as indicated by the lines Fxxx_grCNT[1:0] being "00", then transition T6 occurs to return to the IDLE state. If, however, the Fxxx_grCNT[1:0] lines indicate more than a one-word transfer operation, then transition T7 occurs. In state WGRANT2, the FBUS slave state machine 201 causes another 64-bit word of data to be transferred to the FBUS under the control of signals on lines 242, 243 and 244. States WGRANT3 and WGRANT4 are similar to state WGRANT2 in that a 64-bit word of data is transferred to the FBUS in each state. Both states WGRANT3 and WGRANT4 are used for four-word transfers as indicated by Fxxx_grCNT[1:0] being "11" and only state WGRANT3 is used for three-word transfers as indicated by Fxxx_grCNT [1:0] being "10".

DMA address configuration block 221 of FIG. 3 contains three 32-bit registers: a status register 245, a mask register 246 and a control register 247. The status register 245 is a register which can be read but cannot be written from the FBUS. Each respective one of the first eight bits indicates whether the current address register for the corresponding DMA channel has reached its stop address. When the current address register of a DMA channel is loaded from the FBUS, the corresponding bit in the status register is reset.

The control register 247 is a register which can be read and written from the FBUS. Bits[7:0] specify which DMA channel is enabled for operation. A bit corresponding to a DMA channel that has reached its stop address is reset by the DMA controller. A processor on the FBUS can set this bit to restart operation of the DMA channel. If the enable bit for any channel is a "0", the DMA controller will not output a DMA acknowledge signal for that DMA channel. Bits [19:16] specify which of four pairs of DMA channels is(are) linked together as a double-buffer(s). For example, if DMA channel 0 and DMA channel 1 are linked together as a double-buffer by setting bit 16 in the control register 247, then the DMA controller will automatically switch to DMA channel 1 when the current address of DMA channel 0 reaches its stop address and will automatically switch to DMA channel 0 when the current address of DMA channel 1 reaches its stop address. Bits[28:21] contain information regarding whether each channel is in read mode or write mode. If a processor on the FBUS sets one of these bits to a "1", the corresponding DMA channel will be used for read operation. Other DMA channels will be used for write operation. Bit[31] specifies whether the DMA controller is enabled to output an EOP (end-of-process) signal from EOP terminal 248. EOP terminal 248, for example, is coupled to an interrupt controller to interrupt the processor on the FBUS that reinitializes the current address registers in the DMA controller. If bit[31] is a "0", then the DMA controller will not output an end-of-process signal on terminal 248 even if a DMA channel has reached its stop address.

Each bit in the control register 247 has a corresponding bit in mask register 246. If a mask bit is a "0", then changes cannot be made to the corresponding bit in the control register 247. Initially, each bit in the mask register 246 is set to a "1" (i.e., not masked).

Figure 7G:
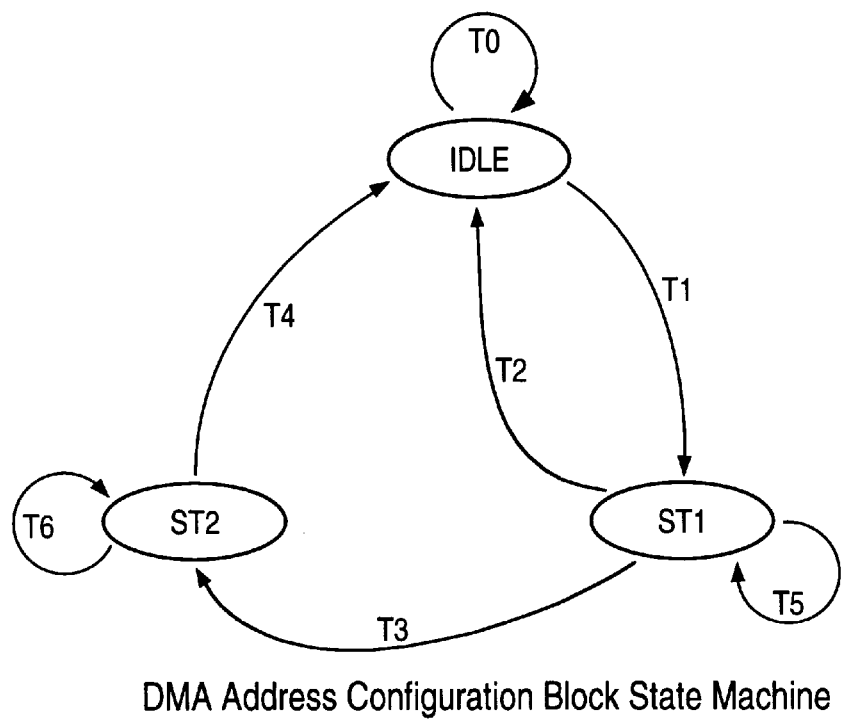

FIG. 7G is a state diagram illustrative of an operation of a state machine in the DMA address configuration block 221 of FIG. 3. This state machine facilitates the accessing of status register 245, mask register 246, control register 247, the current address registers 222 and the stop address registers 223. If, for example, a processor on the FBUS is to read a current address register in the DMA controller 200, then the FBUS chip select line Fxxx_cs_l for the DMA controller is asserted by the FBUS bus arbiter, and the address of the current address register is put on the FBUS address lines Faddr[31:0] by the processor. This address is available to the DMA address configuration block 221 through lines 249. If such an address is not detected, transition T0 occurs. If such an address is detected, transition T1 occurs.

In state ST1, if the operation is a write, data is supplied from the FBUS data lines Fdata[63:0] to the DMA address configuration block 221. If the data is to be written into a current address register or a stop address register, the data is passed to the appropriate register via 32-bit data lines 250. Which register receives the data is determined by the address supplied through lines 249, 5-bit select bus 251 and read/write line 252. If the operation is a write operation, the data is loaded into the selected register, and transition T2 occurs to return to the IDLE state.

If the operation is a read operation, the data must be returned to the FBUS with the transaction request ID received with the request. If request register 218 is full, the transaction request ID cannot be passed through it. The request register 218 is therefore monitored. If the request register 218 is full, transition T5 occurs until the request register 218 is not full (bit [53] is cleared). When the request register is no longer full, transition T3 occurs.

In state ST2, the requested data is supplied back to the FBUS. The contents of the current address registers and stop address registers are, for example, transferred through lines 253 to the DMA address configuration block 221, through lines 254 and, multiplexer 206 and tri-statable buffers 210 to the FBUS data lines Fdata[63:0]. When the request register 218 is no longer full as indicated by a full signal on line 240 from request register bit [53], the transaction ID of the read operation is output onto the FBUS via request register 218. Transition T4 then occurs to return to the IDLE state.

Figure 9:
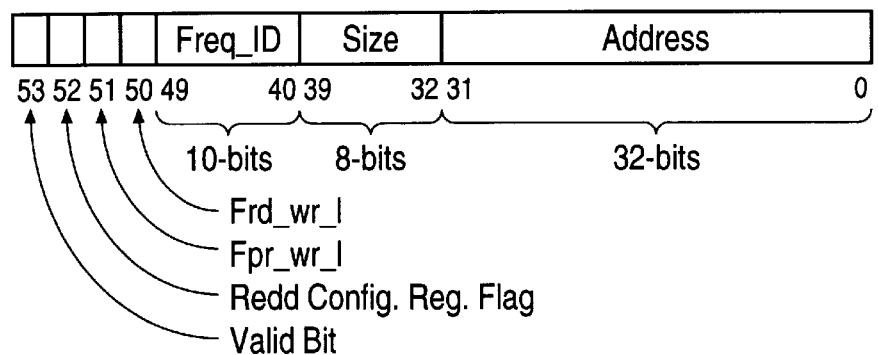
FIG. 9 is a diagram of the request register of the DMA controller of FIG. 3.

FIG. 9 is a diagram of the request register 218 of FIG. 3. Multiple cycles are required to generate an address and the associated transaction ID. By having a separate request register 218, a prepared address and transaction request ID can be stored in the request register 218 while another address and transaction request ID are being prepared. Bit[53] is the "valid bit" which indicates that the request register 218 contains a valid address and is therefore "full" and not available. The valid bit is set by the address generation block 217 when the request register 218 is loaded and is cleared by the FBUS slave state machine 201 after the contents have been output onto the FBUS.

Bit[52] is a bit which is set by the address generation block 217 when the request register 218 is loaded. This bit indicates that data being read is to be supplied onto the FBUS through multiplexer 206. The FBUS slave state machine 201 monitors this bit to determine whether to transition to state T3 or to transition to state T5. This bit is overwritten when the address generation block 217 loads the request register 218 with the next address.

Bit[51] corresponds with the FBUS line Fpr_wr_l. When asserted low, this bit specifies that the operation is a partial write operation. This bit is always high in the presently described implementation because the DMA controller 200 does not support partial write operations. Bit[50] stores the read/write bit for the request in request register 218 and corresponds with the FBUS line Frd_wr_l. Bits [49:40] store the 10-bit transaction ID which will be output onto FBUS lines Freq_ID[9:0] with the transaction request. Bits[39:32] store 8-bit size data for the transaction request. Bits[31:0] store a 32-bit address for the transaction request and correspond with FBUS address lines Faddr[31:0].

Figure 10:
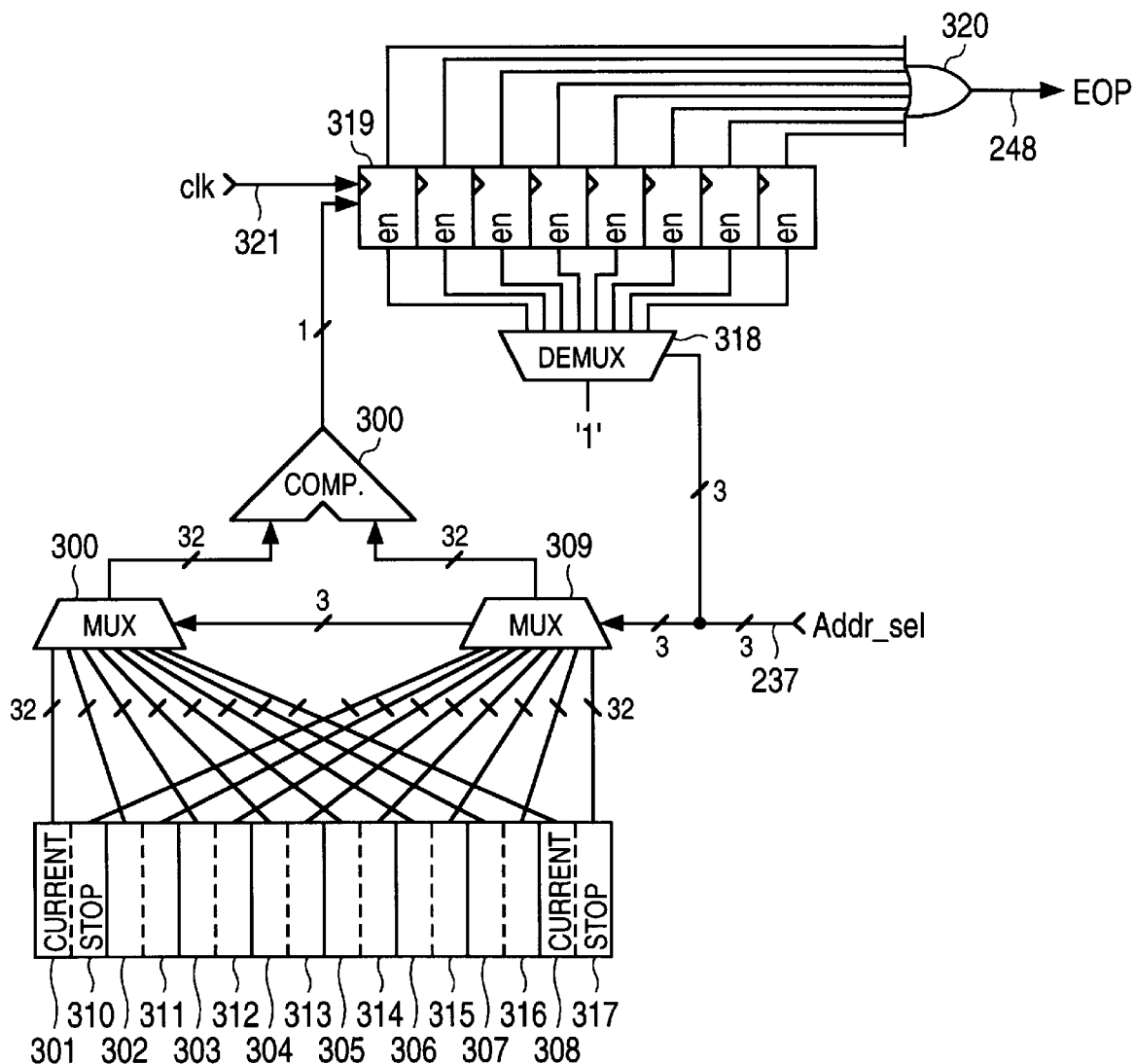
FIG. 10 is a simplified diagram of one possible implementation of a multiplexer and comparator block of the DMA controller of FIG. 3.

FIG. 10 is a simplified diagram illustrating one possible implementation of multiplexer and comparator block 224 of FIG. 3. A 3-bit value on select bus 237 determines the DMA channel of which the current address and the stop address are to be compared. Eight-to-one 32-bit multiplexer 300 selects the current address register (301–308) of the selected DMA channel and eight-to-one 32-bit multiplexer 309 selects the stop address register (310–317) of the selected DMA channel. Comparator 300 compares the content of the selected current address register with the content of the selected stop address register. The 3-bit value on select bus 237 controls an one-to-eight demultiplexer 318 such that the bit of register 319 corresponding with the selected DMA channel is enabled. If the output of comparator 300 is a "1" indicating that the content of the selected current address register matches the content of the selected stop address register, then the corresponding bit in register 319 which is enabled will be loaded with a "1" when a common clock signal 321 clocks all the bits of register 319, otherwise the bit will be loaded with a "0". In one embodiment, only the bit in register 319 corresponding to the particular current address register just incremented is set or reset. The contents of the other bits remain correct until their current address registers are incremented. The output of comparator 300 is supplied to the data inputs of all the bits of register 319. An eight input OR gate 320 outputs a digital high signal on output terminal EOP (end-of-process) if any of the bits of register 319 is set. In this embodiment, the signal EOP is output by the multiplexer and comparator block 224 rather than the DMA address configuration block 221.

The Appendix includes a hardware description (in the well-known hardware description language "Verilog") for the following blocks in accordance with a specific embodiment: the write buffer input multiplexer, the write buffer, the write buffer control circuit, the write buffer output multiplexer and associated buffer, the read buffer, the read buffer control circuit, the codec information FIFO and associated input multiplexer, the address generation block, and the ID register and ID comparator block.

Although the present invention is described in connection with certain specific embodiments for instructional purposes, the present invention is not limited thereto. DMA circuits which do not employ the specifics of the embodiment of FIG. 3 can be realized using conventional hardware design principles or using a hardware description language such as Verilog. The size data used by the DMA controller circuit can be received by the DMA controller circuit from the FBUS in some embodiments. The size data can also be received by the data bus of a DMA channel rather than via special size lines. Accordingly, various modifications, adaptations, and combinations of various features of the described embodiments can be practiced without departing from the scope of the invention as set forth in the claims.

What is claimed is:

1. A DMA controller circuit comprising:

means for receiving, in response to a single DMA request associated with a first bus, either multiple chunks of data or a single chunk of data from said first bus depending on size data associated with said first bus received by said means, said size data not being received in the form of two addresses;

a buffer storing data received from said first bus in response to said DMA request; and an address generator generating an address onto a second bus to transfer data from said buffer and to said second bus, wherein:

said means for receiving is also for receiving, in response to a single DMA request associated with a third bus, either multiple chunks of data or a single chunk of data from said third bus depending on size data associated with said third bus received by said means;

said first bus comprises: a plurality of data lines; a DMA request line; and a plurality of size lines, said size data associated with said first bus being supplied to said DMA controller circuit on said size lines of said first bus; and said third bus comprises: a plurality of data lines; a DMA request line; and a plurality of size lines, said size data associated with said third bus being supplied to said DMA controller circuit on said size lines of said third bus.

2. The DMA controller circuit of claim 1, wherein said means for receiving comprises:

an arbiter coupled to said DMA request line of said first bus, to said DMA request line of said third bus, and to said buffer.

3. The DMA controller circuit of claim 2, wherein said means for receiving further comprises:
  means for simultaneously storing first size data received in association with a first DMA request and second size data received in association with a second DMA request.

4. The DMA controller circuit of claim 3, wherein said means for storing is also for storing identification bits with each stored size data, said identification bits being indicative of whether said size data is associated with said first bus or said third bus.

5. The DMA controller circuit of claim 1, wherein said address generator generates one address onto said second bus for each chunk of data to be transferred from said buffer to said second bus.

6. The DMA controller circuit of claim 1, wherein said means for receiving comprises:
  a multichannel multiplexer having a first plurality of input leads, a second plurality of input leads, at least one select input lead, and a plurality of output leads, said first plurality of input leads being coupled to said plurality of data leads of said first bus, said second plurality of input leads being coupled to said plurality of data leads of said third bus, said plurality of output leads being coupled to said buffer.

7. The DMA controller circuit of claim 1, further comprising:
  a current address register, a stop address register, but no start address register associated with said first bus; and
  a current address register, a stop address register, but no start address register associated with said third bus.

8. The DMA controller circuit of claim 7, further comprising:
  an end of process output lead; and
  a control register writable from said second bus, wherein the DMA controller circuit supports a channel link mode such that an end of process signal is not generated onto said end of process lead when said address generator generates an address equal to a stop address stored in the stop address register associated with said first bus, rather no end of process signal is generated and the next address generated by the address generator is an address stored in said current address register associated with said third bus.

9. A method comprising:
  storing a first current address from a processor into a first register of a DMA controller;
  receiving into said DMA controller first size data and an associated first DMA request signal from a first I/O device, said first size data and said first DMA request signal being associated with a DMA channel through said DMA controller; and
  transferring, in response to said DMA request signal, a first amount of data indicated by said first size data through said DMA channel, between said first I/O device and locations in a memory identified by said first current address from said processor.

10. The method of claim 9, further comprising:
  incrementing said current address by an amount corresponding to said first amount of data;
  receiving into said DMA controller second size data and an associated second DMA request signal from said first I/O device, said second size data and said second DMA request signal being associated with said DMA channel; and
  transferring, in response to said second DMA request signal, a second amount of data indicated by said second size data through said DMA channel, between said first I/O device and locations in a memory identified by said current address.

11. The method of claim 10, wherein said first amount of data involves a first number of words of data, and wherein said second amount of data involves a second number of words of data.

12. The method of claim 9, further comprising:
  storing a second current address from said processor into a second register of a DMA controller;
  receiving into said DMA controller second size data and an associated second DMA request signal from a second I/O device, said second size data and said second DMA request signal being associated with a second DMA channel; and
  transferring, in response to said second DMA request signal, a second amount of data indicated by said second size data through said second DMA channel, between said second I/O device and locations in said memory identified by said second current address from said processor.

13. The method of claim 12, wherein said first amount of data involves a first number of words of data, and wherein said second amount of data involves a second number of words of data.

14. A DMA system comprising:
  a plurality of I/O devices;
  a DMA controller implementing a plurality of DMA channels for accessing a memory, each DMA channel being associated with one of the I/O devices;
  a first bus through which the DMA controller connects to the memory; and
  a plurality of DMA bus, wherein each DMA bus connects a corresponding one of the I/O devices to the DMA controller, each DMA bus comprising:
    a plurality of data lines;
    a DMA request line; and
    a plurality of size lines for a size data signal indicating a number of chunks of data to be transferred via the data lines during a DMA transfer requested via a signal on the DMA request line.

15. The DMA system of claim 14, wherein:
  the DMA controller comprises a plurality of current address registers with each current address register being associated with one of the DMA buses; and
  a processor is able to write current addresses for DMA operations, via the first bus to the current address registers, the current address from the processor being used in a DMA operation that the I/O devices request via the associated DMA bus.

16. The DMA system of claim 15, wherein the DMA controller further comprises
  a buffer storing data received from one of the DMA buses in response to the DMA request; and
  an address generator that uses one of the current address registers when generating an address onto a first bus to transfer data from the buffer and to the memory.

* * * * *